United States Patent [19]

Smith

[11] 4,204,356
[45] May 27, 1980

[54] UNDERWATER FISHING LURE RECIPROCATING DEVICE

[76] Inventor: LaVerne Smith, 7551 Thornapple River Dr., Caledonia, Mich. 49316

[21] Appl. No.: 888,643

[22] Filed: Mar. 21, 1978

[51] Int. Cl.² .............................................. A01K 97/00
[52] U.S. Cl. .................................... 43/26.1; 43/27.4; 43/43.13
[58] Field of Search .................. 43/4, 19.2, 26.1, 43.1, 43/43.13, 42.03, 27.4

[56] References Cited

U.S. PATENT DOCUMENTS

| | | |
|---|---|---|
| 1,478 | 1/1840 | Southworth . |
| 4,517 | 5/1846 | Hand . |
| 1,008,372 | 11/1911 | Seelye . |
| 1,436,843 | 11/1922 | White . |
| 1,578,835 | 3/1926 | Kothe . |
| 2,392,335 | 1/1946 | Morrill . |
| 2,643,478 | 6/1953 | Paulsen ............................ 43/19.2 |
| 2,691,234 | 10/1954 | Riley .......................... 43/42.03 X |
| 2,749,649 | 6/1956 | Fitzsimmons . |
| 2,789,386 | 4/1957 | Creelman .......................... 43/43.13 |
| 3,001,313 | 9/1961 | Long ............................... 43/43.1 X |
| 3,269,051 | 9/1966 | Saunders . |
| 3,550,302 | 12/1970 | Creviston .......................... 43/19.2 X |
| 3,568,352 | 3/1971 | Hill . |
| 3,614,016 | 10/1971 | Rieth . |
| 3,623,259 | 11/1971 | Rode ............................... 43/19.2 |
| 3,645,030 | 2/1972 | Milburn ........................... 43/26.1 |
| 3,659,370 | 5/1972 | Ritter . |
| 3,797,159 | 3/1974 | Rieth . |

FOREIGN PATENT DOCUMENTS 1059524  3/1954  France ......................... 43/42.03

Primary Examiner—Nicholas P. Godici
Attorney, Agent, or Firm—John A. Waters

[57] ABSTRACT

An underwater fishing lure reciprocating device for downrigger trolling apparatus comprises a mounting member that is attached to the end of the downrigger cable and a reciprocating member movably mounted on the mounting member. The reciprocating member includes a clip for holding the fishing line which reciprocates with movement of the reciprocating member with respect to the mounting member. An underwater drive means causes the reciprocating member to reciprocate at least when the device is being towed behind a boat. Desirably, the reciprocating member and drive means are a waterwheel having baffles that are formed and attached such that the wheel rotates when it is towed behind a boat. The clip is attached to a trailing arm that is eccentrically mounted on the wheel. A stabilizing fin holds the waterwheel in a vertical position with its axis perpendicular to the direction of movement of the wheel. A separate clip on the stabilizing fin for the fishing line prevents the reciprocating movement from being transmitted to the fisherman as a reciprocating tug on the fishing line. The baffles can be pivotable baffle plates attached by clips to openings in the outer periphery of the wheel. Other types of baffles also can be employed.

16 Claims, 13 Drawing Figures

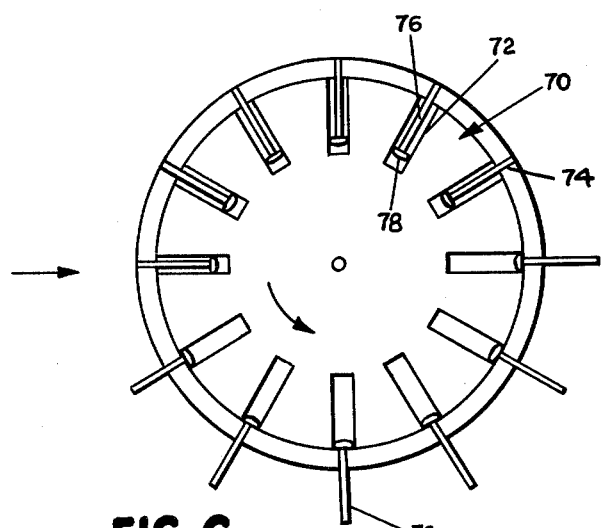
FIG. 6
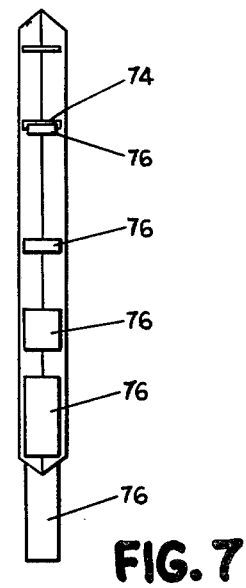
FIG. 7
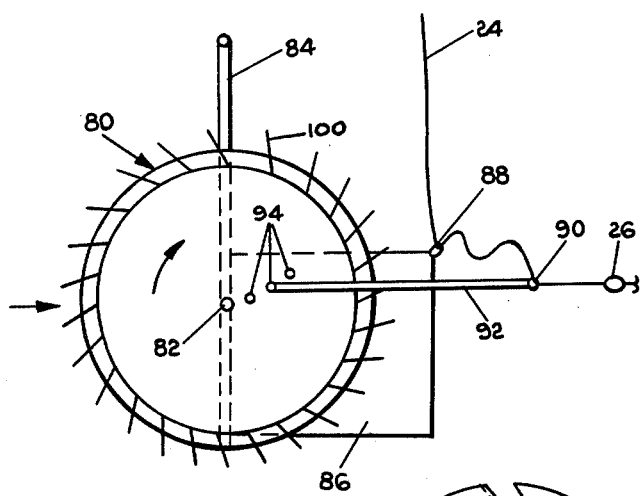
FIG. 8
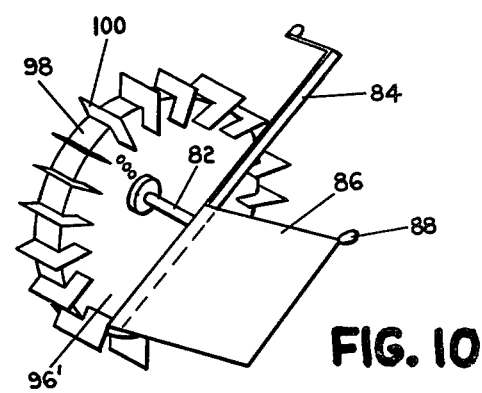
FIG. 10
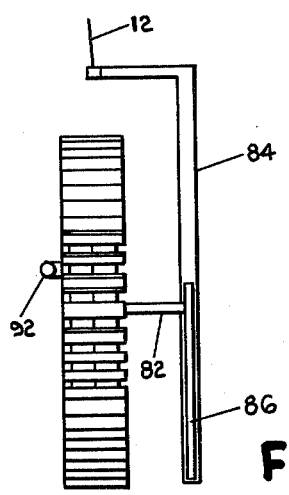
FIG. 9
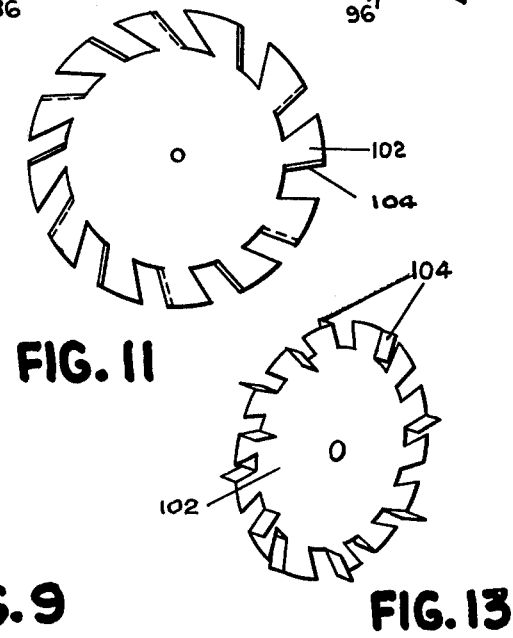
FIG. 11
FIG. 13
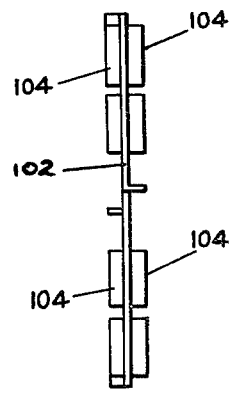
FIG. 12

UNDERWATER FISHING LURE RECIPROCATING DEVICE

BACKGROUND OF THE INVENTION

1. Field of the Invention

The present invention relates to downrigger trolling apparatus and more particularly to an underwater fishing lure reciprocating device for use in connection with downrigger trolling apparatus.

2. Description of the Prior Art

A downrigger is employed in the sport of fishing for trolling below the surface of the water. A downrigger includes a cable mounted on a large reel on the boat. Sometimes a depth measuring device is incorporated in the apparatus. A heavy weight is attached to the end of the downrigger cable and a fishing line with attached lure is releasably clipped to the weight or the end of the cable. The weight is lowered to the desired depth with the fishing line attached thereto. When a fish bites the lure, the line becomes unclipped from the weight and the fisherman is able to play and reel in the fish without having to overcome the drag of the heavy weight attached to the downrigger cable.

In a trolling operation, particularly when a downrigger is employed for trolling, the fishing lure is pulled through the water at a relatively constant rate of speed. In casting operation, on the other hand, the fisherman is able to impart a pulsating or jerking movement to the lure as he reels in his fishing line by periodically pulling up on the tip of his rod. This jerking movement provides a greater attraction for fish than a steady movement of the lure. The absence of a jerking or pulsating movement in the lure employed in trolling is one of the drawbacks with this type of operation.

One of the principal objects of the present invention is to provide a reciprocating device that can be used in trolling and particularly in connection with downrigger trolling that superimposes a jerking or reciprocating movement of the fishing lure on top of the steady movement of the lure as it is pulled through the water.

SUMMARY OF THE INVENTION

The present invention comprises an underwater fishing lure reciprocating device for a downrigger trolling apparatus, wherein a fishing line and attached lure are releasably clipped to a towing line or weighted cable and lowered from a boat by a reel a predetermined depth into the water for trolling. The reciprocating device comprises a mounting member attached to the cable, a reciprocating member movably mounted on the mounting member and including line engaging means for releasably engaging the fishing line. The reciprocating member is movable with respect to the mounting member such that the line engaging means is caused to reciprocate forward and backward, reciprocation of the line engaging means imparting a reciprocating movement to the fishing line and lure. An underwater drive mechanism causes the reciprocating member to reciprocate under water at least when the reciprocating device is being towed behind the boat. Desirably, the drive mechanism is operated by the movement of the reciprocating device through the water with the movement of the water causing reciprocation of the reciprocating member.

The reciprocating member of the present invention is a wheel rotatably mounted on the mounting member, with the line engaging means being a releasable line holding clip eccentrically mounted on the wheel such that the clip reciprocates forward and back with respect to the axis of the rotation of the wheel as the wheel rotates. The underwater drive means comprises a plurality of water-catching baffles mounted around the periphery of the wheel, the baffles being fabricated and mounted such that water passing over the wheel in a direction perpendicular to the axis of rotation of the wheel impinges on the baffles so as to produce a force that urges rotation of the wheel in a predetermined direction.

A stabilizing fin holds the mounting member in a predetermined position as the reciprocating device moves through the water, the stabilizing fin holding the mounting member such that the wheel is held in a vertical position with its axis of rotation being generally perpendicular to the direction of movement of the wheel through the water.

Preferably the baffles are pivotably mounted around the outer periphery of the wheel for movement between open and closed positions. The baffles comprise removable clips pivotably mounted in openings formed around the outer periphery of the wheel, with each clip having a transverse baffle plate attached thereto. The baffle plates open into a water-catching position when moving in the direction of water flow and close into a non-water-catching position when moving against the direction of flow of water. The clips can be manually removed for changing the number of baffles on the wheel, thereby changing the rate of reciprocation of the fishing lure.

Another type of baffle that can be employed is a series of fins that are mounted on the wheel at a skewed angle. Alternatively, the baffles can be baffle plates that are freely pivotable on pins attached around the periphery of the wheel but engage stop pins attached to the wheel such that the baffles are held in a water-catching position when moving in the direction of water flow and are permitted to pivot to a non-water-catching position when moving against the direction of the water flow. A waterwheel with skewed fins also can be formed by stamping the fins out of a single sheet of metal. A waterwheel having fins that fit into slots in the wheel and are radially slidable in such slots into and out of a water-catching position also can be employed.

A stabilizing fin attached to the mounting member holds the waterwheel in a vertical position with its axis of rotation perpendicular to the direction of movement. A second clip attached to the stabilizing fin prevents the reciprocating movement of the fishing lure from being transmitted to the fisherman as a reciprocating tug on the line. The fishing line is first attached to a first clip mounted on the end of a trailing arm eccentrically mounted on the waterwheel. The line is then attached to the second clip before extending upwardly to the boat.

A plurality of mounting positions can be provided on the waterwheel for the trailing arm, with each position being a different radial distance from the axis of rotation of the wheel so as to provide a different length of reciprocation of the lure.

The reciprocating device of the present invention superimposes a backward and forward reciprocating or jerking movement to a lure attached to a downrigger trolling apparatus. This additional action makes the lure more attractive to fish and makes it possible to catch more fish than would otherwise be possible with a conventional downrigger apparatus.

These and other advantages and features of the present invention will hereinafter appear. For purposes of illustration, but not of limitation, a preferred embodiment of the present invention is described in detail below and shown in the appended drawings.

BRIEF DESCRIPTION OF THE DRAWINGS

FIG. 6 is a face view of the third embodiment of a waterwheel of the present invention.

FIG. 7 is an edge view of the waterwheel shown in FIG. 6.

FIG. 8 is a face view of a third embodiment of the waterwheel of the present invention.

FIG. 9 is an edge view of the waterwheel shown in FIG. 8.

FIG. 10 is a perspective view of the waterwheel shown in FIG. 8.

FIG. 11 is a face view of a fifth embodiment of a waterwheel constructed in accordance with the present invention.

FIG. 12 is an edge view of the waterwheel shown in FIG. 11.

FIG. 13 is a perspective view of the waterwheel shown in FIG. 11.

DETAILED DESCRIPTION OF THE PREFERRED EMBODIMENTS

Figure 1:
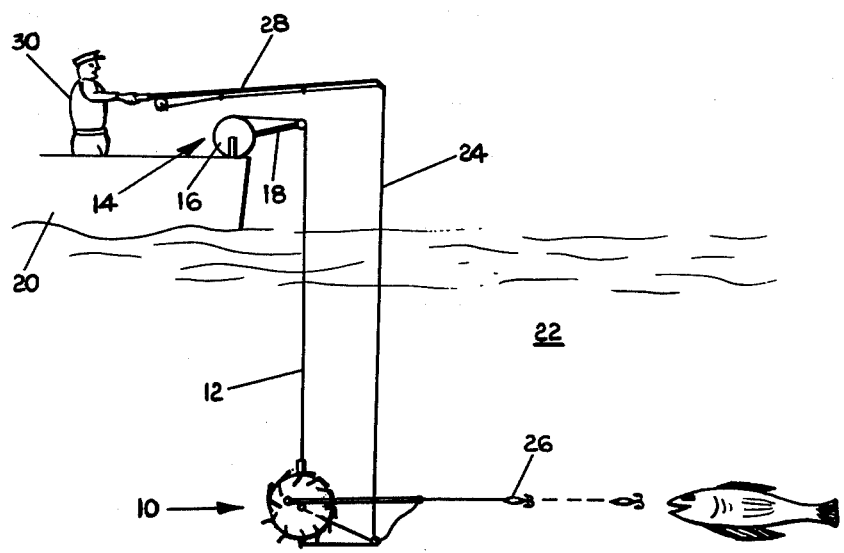
FIG. 1 is a pictorial view showing the apparatus of the present invention employed in a downrigger trolling operation.

Referring now to the drawings and more particularly to FIG. 1, a reciprocating device 10 constructed in accordance with the present invention is shown attached to the end of a downrigger cable 12 in use in a downrigger trolling operation. In this operation, a downrigger 14 including a reel 16 and a short rod 18 is mounted on the rear transom of a boat 20. The downrigger cable 12 is lowered a predetermined depth in water 22, with a fishing line 24 being clipped to the reciprocating device 10 in order to hold a lure 26 at the predetermined depth in the water. The fishing line is attached to a conventional fishing rod 28, which is operated by a fisherman 30.

Figure 2:
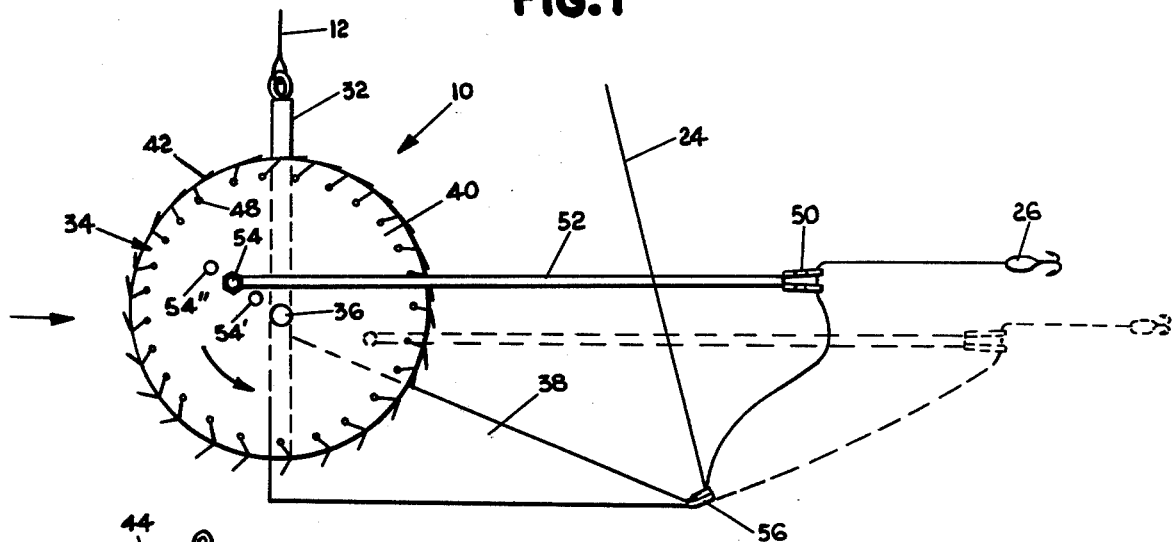
FIG. 2 is a side elevational view of the reciprocating device of the present invention shown in FIG. 1.
Figure 3:
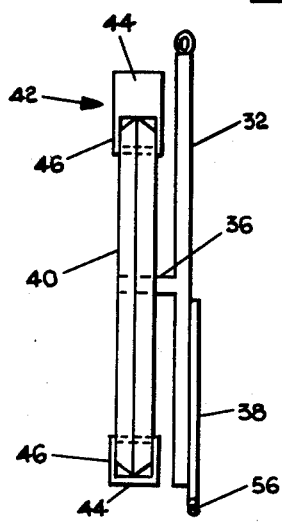
FIG. 3 is an edge view of the waterwheel reciprocating member shown in FIG. 2.

As shown in more detail in FIG. 2, fishing lure reciprocating device 10 comprises a mounting member 32, which is attached to downrigger cable 12 at an upper end, and a reciprocating member 34 in the form of a waterwheel rotatably mounted on mounting member 32 by means of an axle 36. A stabilizing fin 38 is mounted at the bottom of mounting member 32 in a trailing position. Stabilizing fin 38 holds reciprocating member 34 in a vertical position with the axis of rotation being perpendicular to the direction of movement of the wheel or boat through the water.

Reciprocating member 34 comprises a circular disc or wheel 40 and a plurality of baffles 42 pivotably mounted around the outer periphery of the wheel. Baffles 42 include transverse baffle plates 44 mounted on spring clips 46. Spring clips 46 fit into openings 48 around the outer periphery of the wheel and are manually removable in order to remove and insert baffles into the wheel. The ability to change the number of baffles in a wheel makes it possible to affect the speed of rotation of the wheel, and thereby vary the rate of reciprocation of the lure in the water.

As shown in FIG. 2, as the wheel is towed through the water in a direction extending from right to left (FIG. 2 orientation), the force of gravity and the water impinging upon the baffles on the lower side of the wheel to open to a water-catching position and causes the baffles on the upper side of the wheel to pivot to a non-water-catching position. The force on the baffles on the lower side of the wheel is greater than the force on the baffles on the upper side of the wheel. As a result, the wheel rotates in a clockwise direction. With the wheel constructed in this manner, the baffles automatically open any time they are moving with the wheel in the same direction as the water is moving across the surface of the wheel. Conversely, the baffles close to their non-water-catching positions when the baffles are moving against the direction of water movement.

The fishing line is attached to a clip 50, which is mounted on the outer end of a trailing arm 52. Trailing arm 52 is mounted in an eccentric opening 54 in the side of wheel 40. Additional openings 54' and 54" are provided in the side of the wheel at different radial distances from the axis of the wheel in order to vary the length of reciprocation of the lure in a backward and forward direction. The trailing arm 52 is mounted on the opposite side of the wheel from the mounting member such that the rotation of the trailing arm on the wheel does not interfere with the axle of the mounting member.

Fishing line 24 is attached to the reciprocating device of the present invention by first being clipped to a releasable clip 56 at the rear end of stabilizing fin 38. The line is then clipped to clip 50 and then leads to lure 26. The purpose of clip 56 is to prevent the reciprocating movement of the lure from being transmitted to the fisherman in the form of a reciprocating tug on the line. The line extending from the fishing rod to clip 56 will always remain taut, and the only portion of the line that will reciprocate is the loose portion between clips 50 and 56 and downstream from clip 50. When a fish takes the hook, both clips 50 and 56 will be released and the line will be free for the fisherman to haul in the fish.

Figure 4:
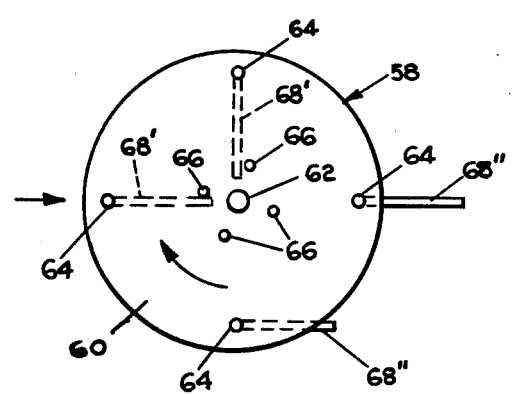
FIG. 4 is a face view of a second embodiment of a waterwheel reciprocating member.
Figure 5:
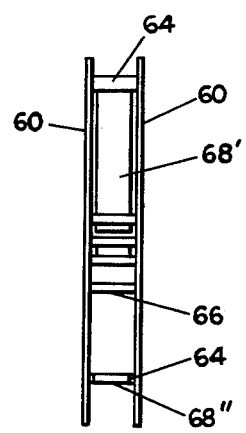
FIG. 5 is an edge view of the waterwheel shown in FIG. 4.

A second embodiment of a waterwheel or reciprocating member that can be employed in the apparatus of the present invention is shown in FIGS. 4 and 5. In this apparatus, wheel 58 comprises two coaxial discs or plates 60 mounted on a common axis 62. A plurality of pivot pins 64 extend between the plates 60 around the outer periphery thereof, and a plurality of stop pins 66 extend between plates 60 adjacent axis 62. Baffle plates 68 are pivotably mounted on pivot pins 64 and are freely rotatable about the axes of the pins. Stop pins 66 are positioned so that baffles 68' on one side of the wheel are held in a water-catching position, while baffles 68" on the other side of the wheel are permitted to pivot freely to a non-water-catching position. With the unequal force on opposite sides of the waterwheel, the force of the water on the wheel as the wheel is dragged through the water will cause the water to rotate in a clockwise direction (FIG. 4 orientation).

A third embodiment of a reciprocating member is shown in FIGS. 6 and 7. In this embodiment, wheel 70 is provided with a plurality of radially extending slots 72 extending inwardly from the outer periphery thereof. These slots terminate in openings 74 in the outer periphery of the wheel. A plurality of baffle plates 76 fit in the slots 72 and are slidable inwardly and outwardly along the slots. A stop member 78 on the inner end of each baffle plate prevents the baffle plate from sliding entirely out of the slot (as shown in FIG. 6). When the baffle plates are facing upwardly (i.e., the upper half of the wheel shown in FIG. 6), the baffle plates slide under the force of gravity into the interior of the wheel and are thus in a non-water-catching position. When the baffle plates are facing downwardly (i.e., in the lower half of the wheel as shown in FIG. 6), the baffle plates slide outwardly in the slots to a water-catching position. The force of the water on the baffle plates as the wheel is towed from right to left (FIG. 6 orientation) causes a greater force on the baffle plates on the bottom portion of the wheel than on the top portion of the wheel and therefore produces a counterclockwise rotation.

Still another embodiment of a reciprocating device of the present invention is shown in FIGS. 8-10. In this embodiment, wheel 80 is rotatably mounted on an axle 82, which is attached to a generally L-shaped support member 84. Support member 84 is attached to downrigger cable 12 at an upper end thereof. A rectangular stabilizing fin 86 is attached to support member 84 and extends rearwardly therefrom. A clip 88 for fishing line is mounted on the rear of the stabilizing fin. A second clip 90 is mounted on the end of a trailing arm 92, the inner end which is mounted on the wheel in any one of three radially spaced eccentric openings 94. Fishing line 24 is first clipped to clip 88 and then to clip 90 and then extends to lure 26.

Wheel 80 comprises a flat disc 96 with an annular collar 98 being mounted around the outer periphery thereof. The baffles of the reciprocating member comprise a plurality of transverse fins 100 mounted in the annular collar. The fins are each placed at a predetermined skewed angle with respect to a radial direction such that water passing in one tangential direction over the fins exerts a stronger rotational force on the fins than water passing in the opposite tangential direction over the fins. Thus, the same net effect achieved in the other embodiments of the waterwheel is achieved with this embodiment as well, namely, dragging the waterwheel through the water produces rotation of the waterwheel in the water.

Another embodiment of the present invention is shown in FIGS. 11-13. In this embodiment, wheel 102 is formed of a single disc or circular plate of metal, with fins 104 being cut out of the outer periphery of the sheet of metal in a simple stamping operation. Fins 104 are formed at the same general angle as fins 100 so that water flow over the fins causes the wheel to rotate about its axis. Fins 104 can be formed in a simple stamping operation with the fins being cut away from the metal and bent along one edge outwardly from the disc or wheel. The fins can be formed such that opposite fins are bent outwardly in opposite directions from the wheel so as to balance the force of the water on the wheel on opposite sides of the wheel. An advantage with this type of waterwheel or reciprocating member is that this would be quite simple to manufacture.

It is contemplated that all of the foregoing waterwheels would be fabricated at least partially from metal and all would possess substantial weight so that the weight of the waterwheel itself would be sufficient to hold the downrigger cable at the desired depth in the water without the necessity of a separate downrigger weight. If it is necessary to employ a separate downrigger weight, the weight could easily be clipped to the bottom of the waterwheel support member.

It should be understood that the foregoing embodiments of the present invention are merely illustrative of the preferred practice of the present invention and that various modifications and changes in the arrangements and details of construction of the embodiments shown herein may be made without departing from the spirit and scope of the present invention.

I claim:

1. An underwater fishing lure reciprocating device for downrigger trolling apparatus wherein a fishing line and attached lure are releasably clipped to a weighted cable and lowered from a boat by a reel a predetermined depth into the water for trolling, said reciprocating device being non-floating and being adapted to be lowered to said predetermined depth on the cable, the reciprocating device comprising:

a mounting member attached to the cable;

a reciprocating member movably mounted on the mounting member, the reciprocating member including line engaging means for engaging the fishing line, the reciprocating member being movable with respect to the mounting member such that the line engaging means is caused to reciprocate forward and backward with respect to the mounting member generally in the direction of movement of the reciprocating device as the reciprocating device is towed through the water, said reciprocation of the line engaging means imparting said forward and backward reciprocating movement to the fishing line and lure as the reciprocating device is towed through the water; and underwater drive means for causing the reciprocating member to reciprocate underwater.

2. An underwater fishing lure reciprocating device according to claim 1 wherein the drive means is operated by the movement of the reciprocating device through the water, the movement of the water over the reciprocating device causing reciprocation of the reciprocating member.

3. An underwater fishing lure reciprocating device for downrigger trolling apparatus wherein a fishing line and attached lure are releasably clipped to a weighted cable and lowered from a boat by a reel a predetermined depth into the water for trolling, said reciprocating device comprising:

a mounting member attached to the cable;

a reciprocating member movably mounted on the mounting member, the reciprocating member including line engaging means for engaging the fishing line, the reciprocating member being movable with respect to the mounting member such that the line engaging means is caused to reciprocate forward and backward, said reciprocation of the line engaging means imparting a reciprocating movement to the fishing line and lure, the reciprocating member being a wheel rotatably mounted on the mounting member, the line engaging means being clip means for releasably holding the fishing lure, the clip means being eccentrically mounted on the wheel such that the clip means reciprocates forward and backward with respect to the axis of rotation of the wheel as the wheel rotates; and underwater drive means for causing the reciprocating member to reciprocate underwater at least when the reciprocating device is being towed behind a boat, the drive means being operated by the movement of the reciprocating device through the water, the movement of the water over the reciprocating device causing reciprocation of the reciprocating member, the underwater drive means including water-operated rotation means mounted on the wheel for causing the wheel to rotate with respect to the mounting member as the wheel is towed through the water.

4. An underwater fishing lure reciprocating device according to claim 3 wherein the mounting member includes a stabilizing fin that holds the mounting member in a predetermined position as the reciprocating device is moved through the water, the stabilizing fin holding the mounting member such that the wheel is held in a vertical position with its axis of rotation being generally perpendicular to the direction of movement of the wheel through the water.

5. An underwater fishing lure reciprocating device according to claim 3 wherein the rotation means for producing rotation of the wheel include a plurality of water-catching baffles mounted on the wheel, the baffles being fabricated and mounted on the wheel such that water passing over the wheel in a direction perpendicular to the axis of rotation of the wheel impinges on the baffles so as to produce a force that urges rotation of the wheel in a predetermined direction.

6. An underwater fishing lure reciprocating device according to claim 5 wherein the baffles comprise a plurality of transverse fins mounted around the outer periphery of the wheel, the fins each being mounted at a skewed angle with respect to a radial line such that water moving in a tangential direction with respect to a fin exerts a greater wheel rotation producing force when flowing in one tangential direction than it does when flowing in the opposite tangential direction.

7. An underwater fishing lure reciprocating device according to claim 5 wherein the baffles are pivotably mounted around the outer periphery of the wheel, the baffles being pivotable such that the baffles flip open and catch water when positioned on one side of the wheel and close so as to permit water to more easily flow past the baffles when positioned on the opposite side of the wheel, the water impinging on the open baffles with greater rotation producing force than on the closed baffles, the water urging rotation of the wheel in the direction of the water passing over the open baffles, the baffles automatically opening when they are moving with the flow of the water and closing when they are moving against the flow of the water as the wheel rotates so as to produce continuous rotation of the wheel in the same direction.

8. An underwater fishing lure reciprocating device according to claim 7 wherein the baffles include removable clips pivotably mounted in openings formed around the outer periphery of the wheel, each clip having a transverse baffle plate attached thereto, the clip being pivotable so as to open and close the baffle plates, the baffle plates laying against the outer edge of the wheel in a relatively non-water-catching position when the baffle plates are in their closed positions, the baffle plates being pivoted upwardly in a relatively water-catching position when the baffle plates are pivoted to their open positions, the baffle plates being held in their water-catching positions when in their open position by engagement of the edges of the baffle plates with the outer periphery of the wheel, the clips being manually removable to vary the number of baffle plates around the wheel.

9. An underwater fishing lure reciprocating device according to claim 3 wherein the clip means is mounted on an outer end of a trailing arm, the inner end of which is mounted in an eccentrically positioned opening in the wheel.

10. An underwater fishing lure reciprocating device according to claim 9 wherein:
the wheel is rotatably mounted on one side thereof to the mounting member, with the trailing arm being mounted on the opposite side of the wheel;
the reciprocating device further comprises a stabilizing fin attached to the mounting member in a trailing position, the stabilizing fin holding the reciprocating device in a predetermined position as the device is moved through the water, the stabilizing fin holding the reciprocating device such that the wheel is positioned vertically with its axis of rotation perpendicular to the direction of movement of the reciprocating device through the water; and
the stabilizing fin includes a second clip means for holding the fishing line, the fishing line being first clipped to the clip means associated with the wheel and then clipped to said boat, the second clip means preventing the reciprocating movement of the lure from being transmitted to the boat as a reciprocating tug on the fishing line.

11. An underwater fishing lure reciprocating device according to claim 5 wherein the wheel comprises a pair of coaxial plates spaced a predetermined distance apart and mounted on a common axle for edgewise movement through the water, the baffles being baffle plates positioned between the coaxial wheel plates, the baffle plates being pivotably mounted around the outer periphery of the wheel by pins extending between the coaxial wheel plates, the wheel further comprising a stop pin for each baffle plate positioned between the coaxial wheel plates, the stop pins being positioned so as to engage the baffle plates and hold them in a water-catching position when the baffle plates are moving in the direction of water flow, the stop pins being positioned so as to release the baffle plates to pivot to a non-water-catching position when they are moving against the direction of water flow.

12. An underwater fishing lure reciprocating device according to claim 5 wherein the baffles are baffle plates slidably mounted in slots in the edge of the wheel, the baffle plates sliding into the wheel into a non-water-catching position when the baffle plates face upwardly, the baffle plates sliding outwardly under the force of gravity so as to protrude beyond the outer edge of the wheel in a water-catching position when the baffles face downwardly.

13. An underwater fishing lure reciprocating device according to claim 6 wherein the wheel comprises a circular plate, and the skewed transverse fins are portions of the circular plate that are cut from the plate and bent outwardly from the plate so as to be attached to the plate along one edge thereof.

14. An underwater fishing lure reciprocating device according to claim 13 wherein alternating fins are bent outwardly on opposite sides of the wheel.

15. An underwater fishing lure reciprocating device for automatically causing forward and backward reciprocation of a fishing lure as it is towed through the water by towing line comprising:

a mounting member attached to the towing line upstream from the lure;

a reciprocating member movably mounted on the mounting member for reciprocation with respect thereto, the reciprocating member including line engaging means for engaging a segment of line extending to the lure and imparting to the lure a generally horizontal forward and backward reciprocating movement with respect to the mounting member as the reciprocating device is towed through the water; and drive means for causing automatic reciprocation of the reciprocating member in response to the movement of the reciprocating member through the water.

16. An underwater fishing lure reciprocating device for automatically causing forward and backward reciprocation of a fishing lure as it is towed through the water by a towing line comprising:

a mounting member attached to the towing line upstream from the lure;

a reciprocating member movably mounted on the mounting member for reciprocation with respect thereto, the reciprocating member including line engaging means for engaging a segment of line extending to the lure and imparting a reciprocating movement to the lure as the reciprocating member reciprocates, the reciprocating member being a waterwheel rotatably mounted on the mounting member, the line engaging means being eccentrically mounted on the waterwheel such that the line engaging means and line and lure attached thereto reciprocate forward and backward as the waterwheel rotates; and drive means for causing automatic reciprocation of the reciprocating member in response to the movement of the reciprocating member through the water, the drive means comprising baffles attached to the waterwheel such that the flow of water over the baffles as the waterwheel is towed through the water automatically causes rotation of the waterwheel in a predetermined direction.

* * * * *